(12) United States Patent
Ruetsch

(10) Patent No.: US 7,742,902 B1
(45) Date of Patent: *Jun. 22, 2010

(54) USING INTERVAL TECHNIQUES OF DIRECT COMPARISON AND DIFFERENTIAL FORMULATION TO SOLVE A MULTI-OBJECTIVE OPTIMIZATION PROBLEM

(75) Inventor: Gregory R. Ruetsch, West Linn, OR (US)

(73) Assignee: Oracle America, Inc., Redwood Shores, CA (US)

( * ) Notice: Subject to any disclaimer, the term of this patent is extended or adjusted under 35 U.S.C. 154(b) by 1172 days.

This patent is subject to a terminal disclaimer.

(21) Appl. No.: 11/029,609

(22) Filed: Jan. 4, 2005

Related U.S. Application Data

(63) Continuation-in-part of application No. 10/691,868, filed on Oct. 22, 2003, now Pat. No. 7,295,956.

(51) Int. Cl.
- *G06F 7/60* (2006.01)
- *G06F 9/45* (2006.01)
- *G06Q 10/00* (2006.01)
- *G06Q 40/00* (2006.01)

(52) U.S. Cl. .................. 703/2; 703/22; 705/2; 705/36 R

(58) Field of Classification Search ............ 703/2, 703/22; 705/5, 36 R
See application file for complete search history.

(56) References Cited

U.S. PATENT DOCUMENTS

| | | | |
|---|---|---|---|
| 5,940,816 A * | 8/1999 | Fuhrer et al. ............... | 706/13 |
| 6,490,572 B2 * | 12/2002 | Akkiraju et al. ............. | 706/19 |
| 7,295,956 B1 * | 11/2007 | Ruetsch ......................... | 703/2 |
| 7,536,364 B2 * | 5/2009 | Subbu et al. .................. | 706/13 |
| 7,593,834 B2 * | 9/2009 | Levitan et al. ................ | 703/2 |
| 2001/0032029 A1 * | 10/2001 | Kauffman ..................... | 700/99 |
| 2003/0055614 A1 * | 3/2003 | Pelikan et al. ................ | 703/2 |
| 2003/0233123 A1 * | 12/2003 | Kindlein et al. .............. | 607/2 |

(Continued)

OTHER PUBLICATIONS

Multi-objective autonomous vehicle navigation in the presence of cooperative and adversarial moving contacts; Benjamin, M.R.; Oceans '02 MTS/IEEE vol. 3, Oct. 29-31, 2002 pp. 1878-1885 vol. 3 Digital Object Identifier 10.1109/OCEANS.2002.1191917.*

(Continued)

*Primary Examiner*—Kamini S Shah
*Assistant Examiner*—Akash Saxena
(74) *Attorney, Agent, or Firm*—Park, Vaughan & Fleming LLP

(57) ABSTRACT

During operation, the system of an embodiment of the present invention receives a representation of multiple objective functions as well as a representation of a domain of interest for the multiple objective functions. Next, the system stores the representations in a memory within the computer system. The system then performs an interval optimization process to compute guaranteed bounds on a Pareto front for the multiple objective functions. During this interval optimization process, the system maintains influence information for boxes in the domain of interest, wherein for a given box, the influence information identifies other boxes which are in the range of influence of the given box and/or in the domain of influence of the given box. The system uses this influence information to identify boxes to be tested against each other for domination. After the boxes are tested, the system eliminates boxes which are certainly dominated by other boxes.

17 Claims, 12 Drawing Sheets

U.S. PATENT DOCUMENTS

2004/0107312 A1* 6/2004 Ruetsch .................. 711/113
2005/0246148 A1* 11/2005 Levitan et al. ................ 703/2
2006/0247798 A1* 11/2006 Subbu et al. ................. 700/44
2007/0005313 A1* 1/2007 Sevastyanov et al. ......... 703/2
2007/0100591 A1* 5/2007 Harazaki ..................... 703/2
2008/0010044 A1* 1/2008 Ruetsch ....................... 703/2

OTHER PUBLICATIONS

Introduction to Evolutionary Multiobjective Optimization: Basic Concepts; Carlos A. Coello Coello; Depto. de Ingeniería Eléctrica Secciόde Computación on; Aug. 16, 2002; pp. 1-30.*
Two original weight pruning methods based on statistical tests and rounding techniques Ledoux, C.; Grandin, J.F.; Vision, Image and Signal Processing, IEE Proceedings—vol. 141, Issue 4, Aug. 1994 pp. 230-237.*

* cited by examiner

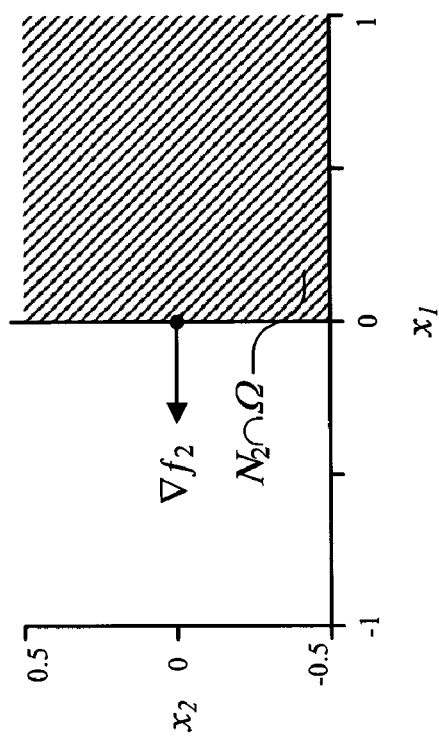
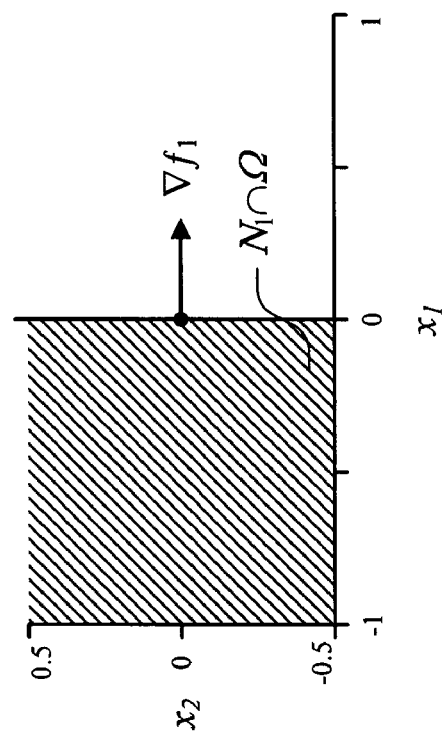
FIG. 5B
FIG. 5A

USING INTERVAL TECHNIQUES OF DIRECT COMPARISON AND DIFFERENTIAL FORMULATION TO SOLVE A MULTI-OBJECTIVE OPTIMIZATION PROBLEM

RELATED APPLICATION

This application is a continuation-in-part of, and hereby claims priority under 35 U.S.C. §120 to, U.S. patent application Ser. No. 10/691,868, entitled, "Method and Apparatus for Using Interval Techniques to Solve a Multi-Objective Optimization Problem," by inventor Gregory R. Ruetsch filed on 22 Oct. 2003 now U.S. Pat. No. 7,295,956.

BACKGROUND

The present invention relates to techniques for solving interval optimization problems within computer systems.

In many real-world optimization problems, there are often several objectives that one would like to optimize. In such cases, rarely do the optima of each objective coincide. Hence, one is left with tradeoffs between the individual objectives that must be incorporated in the solution. The goal of multi-objective optimization is then to determine a set of points that describe the optimal trade-offs between objectives.

An example of multi-objective optimization is that of minimizing price and maximizing performance. A common metric associated with these two objectives is the price-performance ratio. This number, however, oversimplifies the optimization problem. This oversimplification lies in the implicit assumption that a unit of price is equal to a unit of performance, which in general is not the case. For example, a college freshman and a national lab would most likely weight these two objectives differently when purchasing a computer. A more insightful approach to the problem is depicted in FIG. 1, which shows the price and runtime (inverse performance) of a set of points representing (fictitious) computers. Expressed in this manner, one would like to minimize each objective.

Unfortunately, minimizing both objectives simultaneously is generally not possible, and is not the case in this example. The best one can do is come up with an optimal trade-off, where it is not possible to improve one objective without degrading the other. The filled circles in FIG. 1 are points which exhibit this optimal trade-off, and comprise what is termed the "Pareto front." Obtaining the Pareto front is one of the goals of multi-objective optimization, both in identifying optimal points and in providing a sensitivity analysis. This sensitivity analysis considers the shape of the Pareto front. Convex portions of the Pareto front (points which lie on the convex hull of all points) indicate an ability to satisfy all objectives relative to regions of the Pareto front which are non-convex (the "indented" region of Pareto front in FIG. 1).

In addition to determining the Pareto front, another goal of multi-objective optimization is to identify values of the objective functions' independent variables which are mapped to points on the Pareto front. In our example, processor speed, memory, system architecture, etc., are all independent variables (perhaps constrained) of both price and performance objective functions. One would like to know which sets of these independent variables map to points on the Pareto front. Such sets are termed "Pareto optimal sets."

While the application of intervals to solving the multi-objective optimization problem is new, there are a variety of methods for obtaining the Pareto front for analytical expressions. These methods include the weighted objective or aggregate function method, evolutionary algorithms (see "Zitzler, E., Deb, D., and L. Thiele (2000) "Comparison of Multiobjective Evolutionary Algorithms: Empirical Results," *Evolutionary Computing* 8(2): 173-195), and adjoint-gradient methods (see Nemec, M. and D. W. Zingg (2001) "Towards Efficient Aerodynamic Shape Optimization Based on the Navier-Stokes Equations," 15$^{th}$ *AIAA Computational Fluid Dynamics Conference*, AIAA 2001-2532). Each of these methods has its benefits and detractions. The aggregated function method turns the problem into a single objective optimization by weighting each objective. For example, if we have n objectives, $\{f_1, \ldots, f_n\}$, we wish to simultaneously minimize, then one can minimize the fitness function $$F = \sum_{i=1}^{n} w_i f_i(x)$$

for all combinations of $w_i$ such that $0 \leq w_i \leq 1$ and $$\sum_{i=1}^{n} w_i = 1.$$

Although simple in concept, there are several disadvantages to this method. The first is that uniform variations in the weightings space do not evenly map out the Pareto front. A second, and more substantial, disadvantage is that this method cannot capture non-convex regions of the Pareto front. A third disadvantage is that the method does not guarantee finding all solutions. (Note that this disadvantage is to common to all existing solution methods.)

SUMMARY

One embodiment of the present invention provides a system that uses interval techniques within a computer system to solve a multi-objective optimization problem. During operation, the system receives a representation of multiple objective functions as well as a representation of a domain of interest for the multiple objective functions. Next, the system stores the representations in a memory within the computer system. The system then performs an interval optimization process to compute guaranteed bounds on a Pareto front for the multiple objective functions. During this interval optimization process, the system maintains influence information for boxes in the domain of interest, wherein for a given box the influence information identifies other boxes which are in the range of influence of the given box and/or in the domain of influence of the given box. The system uses this influence information to identify boxes to be tested against each other for domination. After the boxes are tested, the system eliminates boxes which are certainly dominated by other boxes.

In a variation on this embodiment, the influence information for a box A contains influence lists, which can include: an intersection list identifying boxes that intersect box A; a domain-of-influence list identifying boxes that exclusively intersect box A's domain of influence; and a range-of-influence list identifying boxes that exclusively intersect the box A's range of influence. (Note that a box that "exclusively intersects" box A's domain-of-influence intersects box A's domain-of-influence but does not intersect box A; or equivalently does not intersect box A's range-of-influence.)

In a further variation, a box B is tested to see if it is certainly dominated by a box A if: box A exclusively intersects box B's domain of influence; or box B exclusively intersects box A's range of influence.

In a further variation, during the interval optimization process, the system iteratively: splits remaining boxes that have not been eliminated into child boxes; evaluates the multiple object functions over the child boxes to determine influence regions for the child boxes; and uses the influence regions for the child boxes to produce influence lists for the child boxes.

In a further variation, producing influence lists for a child box A involves: adding box A's siblings to the intersection list for box A; identifying box A's parent box P; identifying "intersecting boxes" in P's generation which intersect box P; testing children of these intersecting boxes to see if they intersect box A; if so, adding the intersecting children to the intersection list for box A; and if not, adding the non-intersecting children, if they belong, to box A's domain-of-influence list or range-of-influence list. It also involves: determining if children of boxes in parent box P's range-of-influence list belong in box A's range-of-influence list, and if so, adding them to box A's range-of-influence list; and determining if children of boxes in parent box P's domain-of-influence list belong in box A's domain-of-influence list, and if so, adding them to box A's domain-of-influence list.

In a further variation, the iterations continue until either a predetermined maximum number of iterations are performed, or until the largest area of any box is below a predetermined value.

In a variation on this embodiment, the interval optimization process also involves applying a gradient technique to eliminate remaining boxes which have not been eliminated through direct comparisons.

In a further variation, a box $[x]_i$ is eliminated by the gradient technique if an intersection of certainly negative gradient regions $C_j$ for each objective function $f_j$ is non-empty, $$\bigcap_{j=1}^{n} C_j([x]_j) \neq \emptyset,$$

wherein the certainly negative gradient region $C_j$ for objective function $f_j$ is the intersection of $\underline{N}_j([x]_i)$ (the negative gradient region associated with the minimum angle $\underline{\theta}_j$ of the gradient of $f_j$ over the box $[x]_i$) and $\overline{N}_j([x]_i)$ (the negative gradient region associated with the maximum angle $\overline{\theta}_j$ of the gradient of $f_j$ over the box $[x]_i$).

In a variation on this embodiment, a box U certainly dominates a box V if every point u∈U dominates every point v∈V, and a point u dominates a point v under minimization if, $u_i \leq v_i$, i=1, . . . , n, and $u_i < v_i$ for some i∈{1, . . . , n}.

In a variation on this embodiment, for each point on the Pareto front, an improvement in one objective function cannot be made without adversely affecting at least one other objective function.

BRIEF DESCRIPTION OF THE FIGURES

FIG. 5A illustrates a first non-positive gradient region for a point which is Pareto optimal in accordance with an embodiment of the present invention.

FIG. 5B illustrates a second non-positive gradient region for the point which is Pareto optimal in accordance with an embodiment of the present invention.

DETAILED DESCRIPTION

Figure 1:
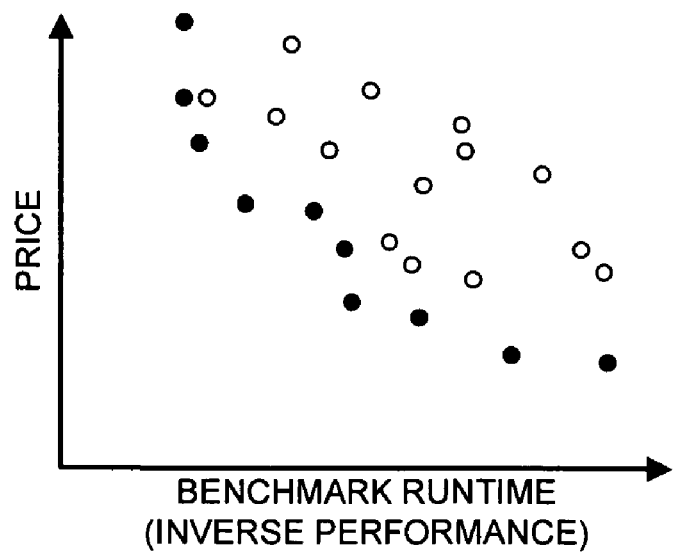
FIG. 1 presents a graph of price versus performance for computer systems.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Interval Computations

Note that interval computation provides an automatic means for bounding roundoff error. Rather than representing a number by a single floating point value, which may or may not exist in machine representation, an interval represents a number by machine representable lower and upper bounds which contain the desired value. Interval computation uses directed or outward rounding such that the resulting interval always contains the mathematical result. In addition to bounding roundoff error, interval computation provides a rich environment for performing set theoretic operations. One of the most powerful aspects of interval computation, however, is that in performing a single function evaluation over an interval, one obtains rigorous bounds of that function over the entire interval. Depending on the value of these bounds, one can prove or disprove certain conjectures. We leverage this feature in multi-objective optimization to eliminate boxes in which we can prove no point is Pareto optimal. In doing so, we capture all Pareto optimal points. In essence, intervals allow one to develop computer techniques, which deal with continua rather than discrete points, and as a result one can perform proofs via computers.

In the next section we utilize the objective function derivatives to formulate a differential definition for local Pareto optima, which will become the basis for the interval-differential formulation. We later present two complimentary techniques for solving the multi-objective problem: (1) a direct-comparison technique, which can be used to solve the global problem, but suffers from inefficiency, and (2) an interval version of the differential formulation, which efficiently solves for local optima. The combination of these two interval techniques results in a composite technique, which is guaranteed to find all global Pareto optimal sets and their projection on the Pareto front.

Multi-Objective Concepts and Definitions

In this section, we briefly formalize concepts and define terms used in multi-objective optimization. We begin by presenting an analytical example, and once the multi-objective optimization concepts have been established through this example, we generalize the concepts.

Consider a case with two objective functions which represent the distance of a point $(x_1, x_2)$ from points $(-\frac{1}{2}, 0)$ and $(\frac{1}{2}, 0)$, $$f_1(x_1, x_2) = \sqrt{\left(x_1 + \frac{1}{2}\right)^2 + x_2^2} \quad f_2(x_1, x_2) = \sqrt{\left(x_1 - \frac{1}{2}\right)^2 + x_2^2} \quad (1)$$

which we want to minimize in a two-dimensional domain $$(x_1, x_2) \in ([-1,1], [-\frac{1}{2}, \frac{1}{2}]).$$

The individual minima of $f_1$ and $f_2$ are the points $(-\frac{1}{2}, 0)$ and $(\frac{1}{2}, 0)$, respectively, so the objectives are minimized at different points in the domain, as is generally the case in multi-objective optimization. What we hope to achieve for such a set of objective functions is an optimal trade-off in objectives. This optimal trade-off can be determined by projecting all the points in this domain into objective space, as depicted in FIG. 2.

Figure 2:
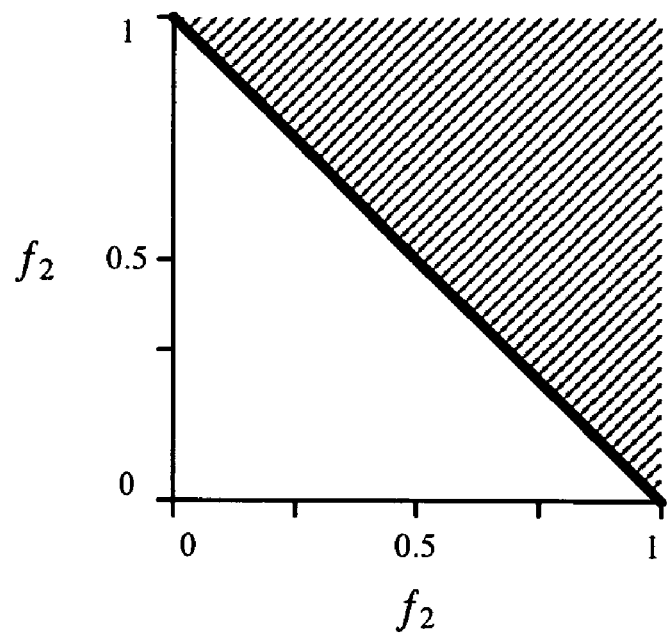
FIG. 2 depicts a Pareto front.

In FIG. 2 the projection of points $(x_1, x_2) \in ([-1,1], [-\frac{1}{2}, \frac{1}{2}])$ into objective space $(f_1, f_2)$ is indicated by the crosshatched region. (Some points are projected above and to the right of the crosshatched region). The points which lie on the bold line comprise the Pareto front for this pair of functions. Points on the Pareto front are nondominated, in that no point exists that can improve one objective without degrading the other.) When projected to objective space, the points in this domain fill the region above the diagonal line. The diagonal line is called the "Pareto front" and represents the optimal trade-off in that there can be no improvement towards minimizing one objective which doesn't adversely affect the other objective. (Since the minimum of each objective is zero, this condition can be interpreted geometrically by requiring the rectangle whose diagonal connects the origin and the point in question to be empty.) On the other hand, all points which lie above the Pareto front can simultaneously improve both objectives by moving towards the Pareto front.

Figure 3:
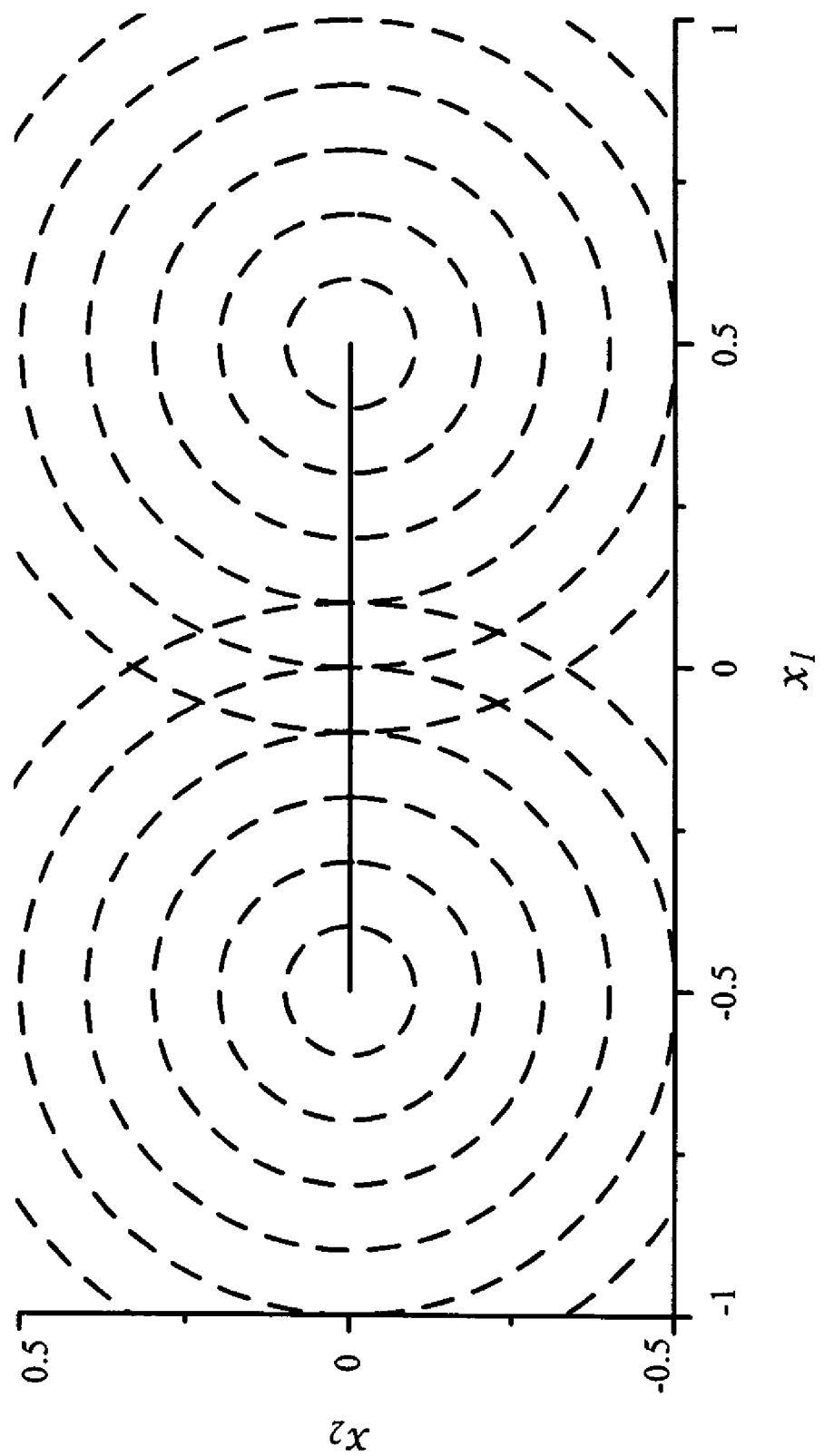
FIG. 3 illustrates a Pareto optimal set.

In addition to determining the Pareto front, the corresponding points in the domain $(x_1, x_2)$ which project onto the Pareto front are desired. Such a point is called "Pareto optimal," and the collection of all such points the "Pareto optimal set." For our example, the Pareto optimal set includes all points in the line segment connecting the two individual minima, depicted in FIG. 3. FIG. 3 illustrates contours (dashed lines) and the Pareto optimal set (solid line) for functions $f_1$ and $f_2$ in Equation (1). The value of these functions are the distances from points $(-\frac{1}{2}, 0)$ and $(+\frac{1}{2}, 0)$, respectively, which result in the circular contours. The Pareto optimal set for this example comprises the points on the line connecting the two individual minima, and projects into the Pareto front in objective space. Note that any point in the domain that is not in the optimal Pareto set can improve both objectives by moving along a path towards the line which comprises the Pareto optimal set.

With the concepts of Pareto front and Pareto optimal set for the above analytical expressions established, we now turn our attention to generalizing these concepts to a case with n objective functions in a D-dimensional domain. In order to generalize the Pareto front to n dimensions, it is useful to establish the concept of dominance. If u and v are n-dimensional vectors, then under minimization u is said to dominate v, denoted as u≺v, if:

$$u_i \leq v_i, i=1, \ldots, n; \text{ and}$$

$$u_i < v_i \text{ for some } i \in \{1, \ldots, n\}.$$

Applying dominance to the Pareto concepts, we say the Pareto front contains points which are nondominated solutions: solutions where an improvement in one objective cannot be made without adversely affecting at least one other objective. Generally, if we wish to minimize n objectives $\{f_1, \ldots, f_n\}$ within a particular domain $\Omega$ of a D-dimensional space $x = (x_1, \ldots, x_D)$, and we define an objective vector $f(x) = (f_1(x), \ldots, f_n(x))$, then a point $x \in \Omega$ is Pareto optimal if:

$$f(x') \not\prec f(x) \forall x' \in \Omega \quad (2)$$

The definition of Pareto optima in Equation (2) utilizes the function evaluations. This point definition becomes the basis for the interval direct-comparison method in a following section. In the next section we utilize the objective function derivatives to formulate a differential definition for local Pareto optima, which will become the basis for the interval-differential formulation.

Differential Formulation

If the objective functions $\{f_1(x), \ldots, f_n(x)\}$ are continuous and differentiable, then it is helpful to leverage the gradient information of these functions in determining local Pareto optima. Just as finding local extrema in single-objective optimization does not guarantee that these points are global extrema, finding local Pareto optima does not imply that these points are contained in the Pareto optimal set. However, finding points that are local Pareto optima can assist in obtaining the Pareto optimal set. This is especially true in the case of interval methods, where consistency checks can be combined with capturing local optima to determine global optima.

Local Pareto optimality extends from (2), which in terms of differential displacement vector $\delta r$ is:

$$f(x+\delta r) \not\prec f(x) \forall \delta r$$

If we denote $d(x, \delta r)$ as the vector of directional derivatives of the objective functions along $\delta r$:

$$d_i(x, \delta r) = \nabla f_i|_x \cdot \delta r;$$

then a Taylor expansion of $f(x)$ results in the condition for local Pareto optimality: a point x is locally Pareto optimal if:

$$d(x,\delta r) \not\prec Z \forall \delta r \quad (3)$$

where Z is the zero vector, i.e. $Z_i=0$ for $i=1, \ldots, n$.

The condition of Equation (3) can be geometrically interpreted as follows. For each objective there is a (D-1)-dimensional plane which is normal to the gradient of $f_i$ at a point x. This plane delineates two semi-infinite regions, one where the local (linearized) gradient is positive, and one where it is negative. Any differentially small displacement into the negative gradient region results improving the objective function, and Equation (3) is satisfied when the intersection of the such regions, one for each objective, is empty. If we represent the negative gradient region for $f_i$ at point x by $N_i(x)$, then Equation (3) is satisfied when:

$$\bigcap_{i=1}^{n} N_i(x) \cap \Omega = \varnothing \quad (4)$$

The domain $\Omega$ appears here in order to account for points which lie on the boundary of $\Omega$. In effect, for points on the boundary, this acts like an additional objective function. For interior points, the presence of $\Omega$ is inconsequential.

Figure 4A:
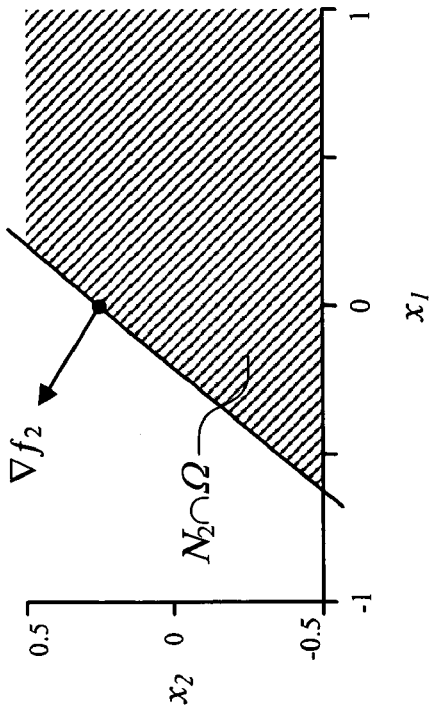
FIG. 4A illustrates a non-positive gradient region for a first objective function in accordance with an embodiment of the present invention.
Figure 4B:
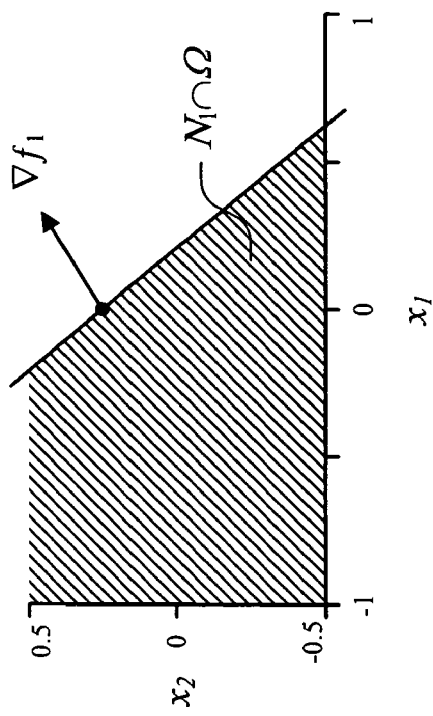
FIG. 4B illustrates a non-positive gradient region for a second objective function in accordance with an embodiment of the present invention.
Figure 4C:
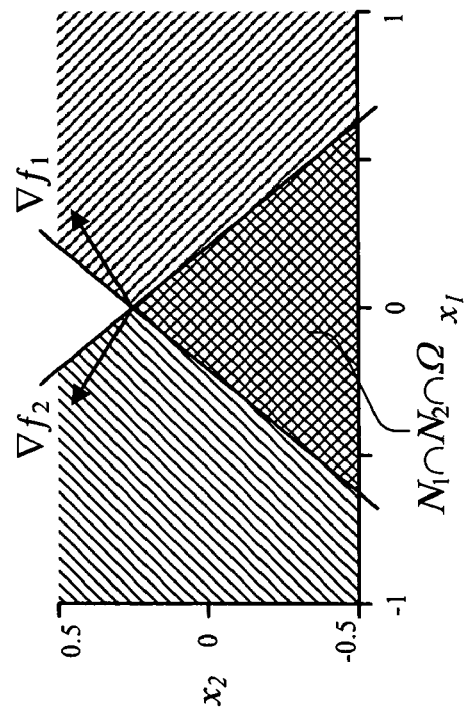
FIG. 4C illustrates overlapping non-positive gradient regions in accordance with an embodiment of the present invention.

The application of the condition in Equation (4) to the example problem in Equation (1) is demonstrated in FIGS. 4A-4C. In FIGS. 4A and 4B, the objectives $f_1$ and $f_2$ are dealt with separately. In each plot, the gradient of the objective at some point is drawn, along with $N_i \cap$ (the intersection of the negative gradient region and the domain) by the shaded regions. In FIG. 4C, these two figures are combined, showing a nonempty region corresponding to $N_1 \cap N_2 \cap \Omega$. Any differential displacement into this crosshatched region will improve both objectives, and as a result the point is not locally Pareto optimal.

FIGS. 5A and 5B illustrate negative gradient regions $N_i$ at a point which is Pareto optimal. $N_1$ and $N_2$ are shown independently in the two diagrams.

Here the gradients are co-linear but opposite in direction, and as such the intersection $N_1 \cap N_2$ is empty. Therefore, this point is locally Pareto optimal. Note that the only way an interior point in a two-objective optimization problem can be Pareto optimal is when the gradients are co-linear but opposite.

In this section, we have established a differential formulation for identifying local Pareto optima. Application of this methodology as it stands is difficult in that one needs to perform this evaluation at every point in domain $\Omega$. One can devise many "shotgun" methods using this differential formulation, such as seeding the domain with points and using the gradient information to traject points towards the optimal Pareto set. The problem with such methods is that they are not guaranteed to capture all Pareto optima. In the next section, we apply interval methods to the differential formulation which, along with in interval version of Equation (2), results in a technique which is guaranteed to capture all Pareto optima.

Interval Concepts

Interval methods grew out of the desire to control roundoff error in floating point computations. The idea is that rather than using a single floating point value to represent a number, which would incur an error if the number is not machine representable, a number is represented by upper and lower bounds which are machine representable. Interval arithmetic is performed in a way to guarantee containment. Intervals are described in more detail in U.S. Pat. No. 6,629,120, entitled "Method and Apparatus for Performing a Mask-Driven Interval Multiplication Operation," by inventors William G. Walster and Dmitri Chiraev.

In addition to operators for arithmetic and function evaluation, intervals have a rich set of relational operators. There are certainly true operations, for example:

$$X \stackrel{c}{<} Y \Longleftrightarrow x < y \ \forall x \in X \text{ and } y \in Y$$

as well as possibly true operations:

$$X \stackrel{p}{<} Y \Longleftrightarrow \exists x \in X \text{ and } y \in Y | x < y$$

These same ideas hold for all relational operators.

Now that some basic concepts of interval arithmetic and computation have been discussed, we apply these concepts to multi-objective optimization, starting with the interval definition of dominance.

Interval Dominance and the Direct-comparison Method

We can extend the notions of certainly and possibly used to define the basic interval relational operators to that of dominance. An interval vector $U=(U_1(x), \ldots, U_n(x))$ certainly dominates an interval vector V according to the following definition:

$$U \stackrel{c}{<} V \Longleftrightarrow u \stackrel{c}{<} v \ \forall u \in U \text{ and } v \in V \quad (6)$$

In terms of the infima and suprema of the components of U and V, we say that $$U \stackrel{c}{<} V$$

if:

$$\overline{u}_i \leq \underline{v}_i \ i=1, \ldots, n \text{ and}$$

$$\overline{u}_I < \underline{v}_I \text{ for some } I \in \{1, \ldots, n\}.$$

Likewise, U is said to possibly dominate V, denoted as $$U \overset{p}{<} V \text{ if:}$$

$\underline{u_i} \leq \overline{v_i}$ i=1, ..., n.

One could apply the definition of certain dominance directly to obtain an interval technique for determining the Pareto front. One would simply search over a set of boxes covering the domain $\Omega$, and eliminate any boxes which were certainly dominated. Then the remaining boxes would be bisected, and the procedure is repeated until some stopping criterion is met.

While this method will work in that no Pareto optimal points will be eliminated, there are several disadvantages inherent in this method. The main disadvantage is that the number of comparisons to determine certain dominance grows rapidly with number of boxes. Performance-wise this becomes costly as the Pareto front is refined.

One aspect of this direct-comparison method that is both advantageous and disadvantageous is that it is a global method. This is disadvantageous with respect to parallelization in a clustered environment—some message passing is needed for comparison between all boxes within an iteration. The global nature of the direct-comparison method is advantageous in that it results in global Pareto optima. This is important since the interval version of the differential formulation produces all the local Pareto optima, and some consistency check is needed to eliminate those local optima which are not global. The direct-comparison method provides this consistency check. Having developed the direct-comparison method, the only remaining piece in obtaining a complete technique is to extend the differential formulation to intervals.

Interval-Differential Formulation

In the direct-comparison method above, we used the concept of certain dominance through the evaluation of the objectives over intervals to eliminate boxes, which are certainly dominated, and therefore contain no Pareto optimal points. In the interval-differential formulation, we again look to develop a criterion which enable us to remove boxes which are certainly dominated, however this criterion is based on the objective function derivatives.

In the point differential formulation, determining local Pareto optima requires the evaluation of the gradient of objective functions. The magnitude of the gradients is inconsequential to the formulation, it is the direction of the gradients that determined the negative gradient regions, $N_i$, and therefore local dominance. In a D-dimensional domain, the direction of the gradient of each objective function can parameterized by D-1 variables. For example, in the two-dimensional domain of Equation (1), we can define the direction of the gradient of the j-th objective by the angle $\theta_j$. If we extend this to intervals, then the interval gradient of the j-th objective function evaluated over the i-th box, $[x]_i$, is:

$G_j([x]_i) = [\nabla f_j]([x]_i)$ takes on a range of directions $[\underline{\theta_j}, \overline{\theta_j}]$. Associated with this range of directions is a range of semi-infinite negative gradient region, denoted as $N_j$. Formally we have:

$N_j(x) \subset N_j([x]_i) \forall x \in [x]_i$

In the point differential formulation, regions where the intersection of the domain and all $N_i$ is non-empty indicated that such a point is not Pareto optimal. We now extend this idea to the interval case. To eliminate a box, we need to establish that every point x in this box satisfies:

$$\bigcap_{j=1}^{n} N_j(x) \neq \varnothing. \tag{7}$$

The intersection with the entire domain $\Omega$ is not included here, as it was in the point formulation—we consider boundary points later in this section. We would like to find an expression analogous to Equation (7) using $N_j$. Suppose we can determine a certainly negative gradient region for objective $f_j$, denoted by $C_j$, which is defined as the subset of $N_j$ that is common to $N_j(x)$ for all $x \in [x]_i$:

$C_j[x]_i) \subset N_j(x) \forall x \in [x]_i$

With knowledge of $C_j$ we can guarantee that Equation (7) holds at all points in the box if:

$$\bigcap_{j=1}^{n} C_j([x]_i) \neq \varnothing.$$

Figure 6A:
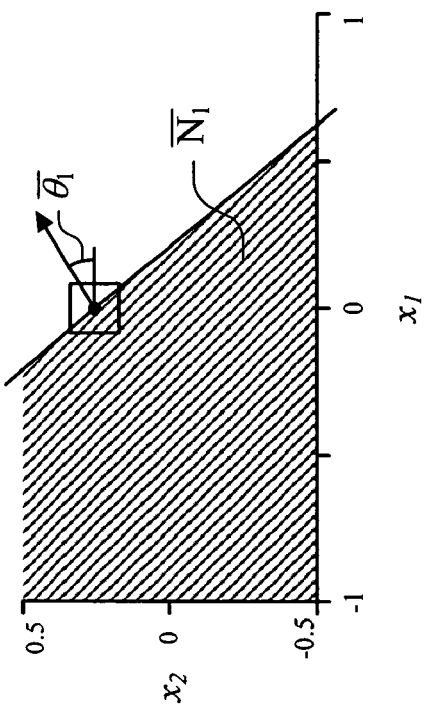
FIG. 6A illustrates a non-positive gradient region associated with a minimum gradient angle for a box in accordance with an embodiment of the present invention.
Figure 6B:
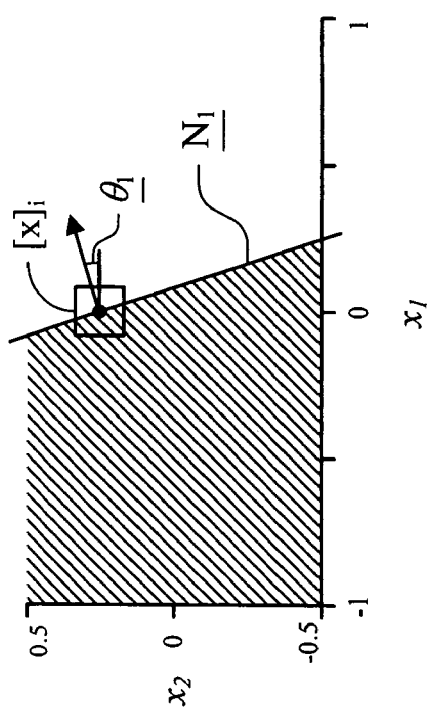
FIG. 6B illustrates a non-positive gradient region associated with a maximum gradient angle for the box in accordance with an embodiment of the present invention.
Figure 6C:
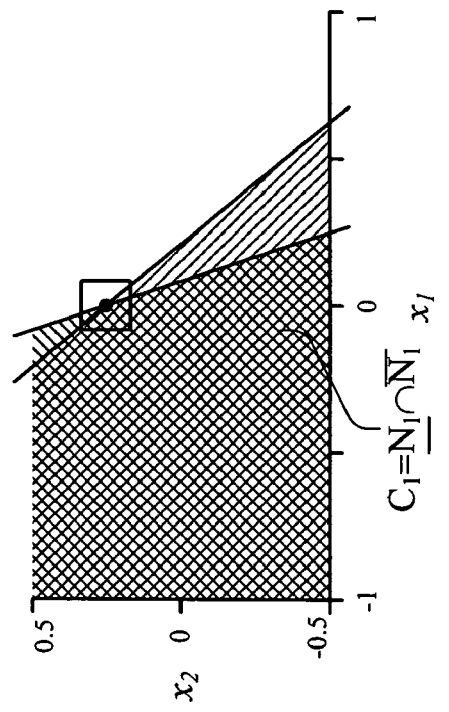
FIG. 6C illustrates a certain non-positive gradient region for the box in accordance with an embodiment of the present invention.

The remaining issue is to determine $C_j([x]_i)$. This region is drawn for a single objective, $f_1$, in FIGS. 6A-6B. FIG. 6A shows the negative gradient region of $f_1$ associated with the minimal angle $\underline{\theta_1}$, of the gradient over the box $[x]_i$. FIG. 6B shows the negative gradient region of $f_1$ associated with the maximum angle $\overline{\theta_1}$ of the gradient over this box. These negative gradient regions are denoted by $\underline{N_1}$ and $\overline{N_1}$, respectively. FIG. 6C shows the intersection of these two regions, which defines the certainly negative gradient region for objective $f_1$. We can define such a region for all objectives:

$C_j = \underline{N_j}([x]_i) \cap \overline{N_j}([x]_i)$

As a result, we now have a condition which, when satisfied, shows that every point in a box $[x]_i$ is not locally, and therefore not globally, Pareto optimal:

$$\bigcap_{j=1}^{n} \left( \underline{N_j}([x]_i) \cap \overline{N_j}([x]_i) \right) \neq \varnothing. \tag{8}$$

The boundary of $\Omega$ in the point formulation was accounted for by taking the intersection of the $N_i$'s with the domain $\Omega$. When operating over a finite area box, there is no extension to account for the boundary in such a simple manner. One needs to account for the boundaries separately. For example, for two objective functions $f_1$ and $f_2$ in a domain of $x \in ([-1,1], [-\frac{1}{2}, \frac{1}{2}])$, one needs to solve two problems. The first using $C_1 \cap C_2$, or Equation (8), as a criterion for eliminating boxes in the interior, and the second using $C_1 \cap C_2 \cap \Omega$ as a criterion for eliminating boxes of the semi-degenerate intervals $(-1, [-\frac{1}{2}, \frac{1}{2}])$, $(1, [-\frac{1}{2}, \frac{1}{2}])$, $([-1,1], -\frac{1}{2})$, and $([-1,1], \frac{1}{2})$. An application of the direct-comparison method over all boxes from these various regions merges these separate optimization problems.

The criterion in Equation (8) for eliminating boxes which do not contain any local Pareto optima, along with the definition of interval dominance of Equation (6) which be used to eliminate boxes which are not global Pareto optimal, can be combined in a robust and efficient implementation of a multi-objective optimization code. Equation (8) provides an efficient means for computing local Pareto optima, and Equation (6) can be applied as a consistency check to eliminate any regions which are local but not global optima.

First Embodiment

One embodiment of the present invention implements a system that uses the interval-differential formulation, from Equation (8), and the direct-comparison method, from Equation (6). This embodiment includes a single loop, which performs eliminations of boxes within each "generation" or iteration.

Figure 7:
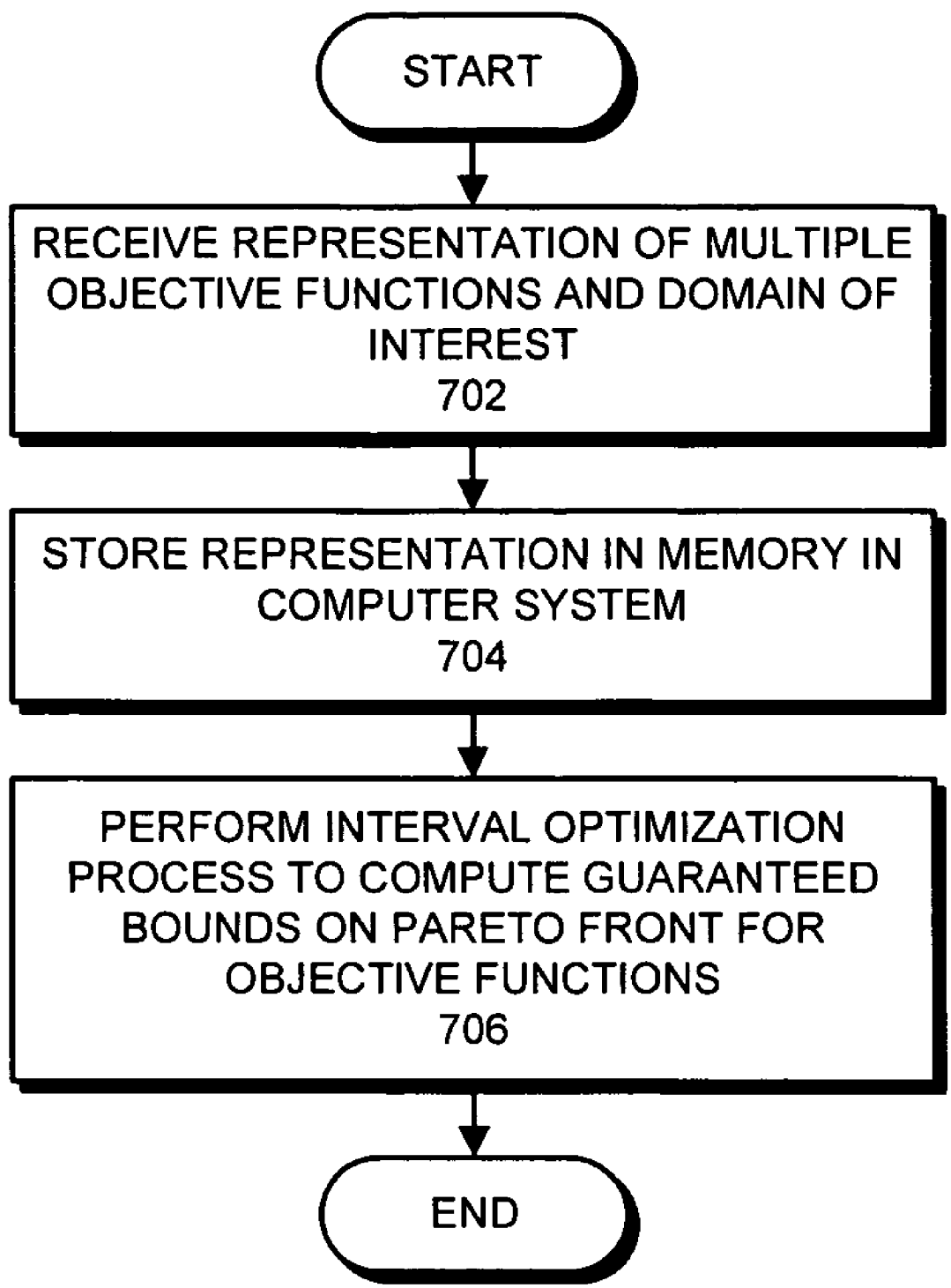
FIG. 7 presents a flow chart of an interval optimization process for a multi-objective function in accordance with an embodiment of the present invention.

Referring to the flowchart in FIG. 7, the system first receives a representation of multiple objective functions $(f_1, \ldots, f_n)$ and a domain of interest (step 702). Next, the system stores this representation in a memory in a computer system (step 704), and performs an interval optimization process to compute guaranteed bounds on the Pareto front for the multiple objective functions (step 706).

Figure 8:
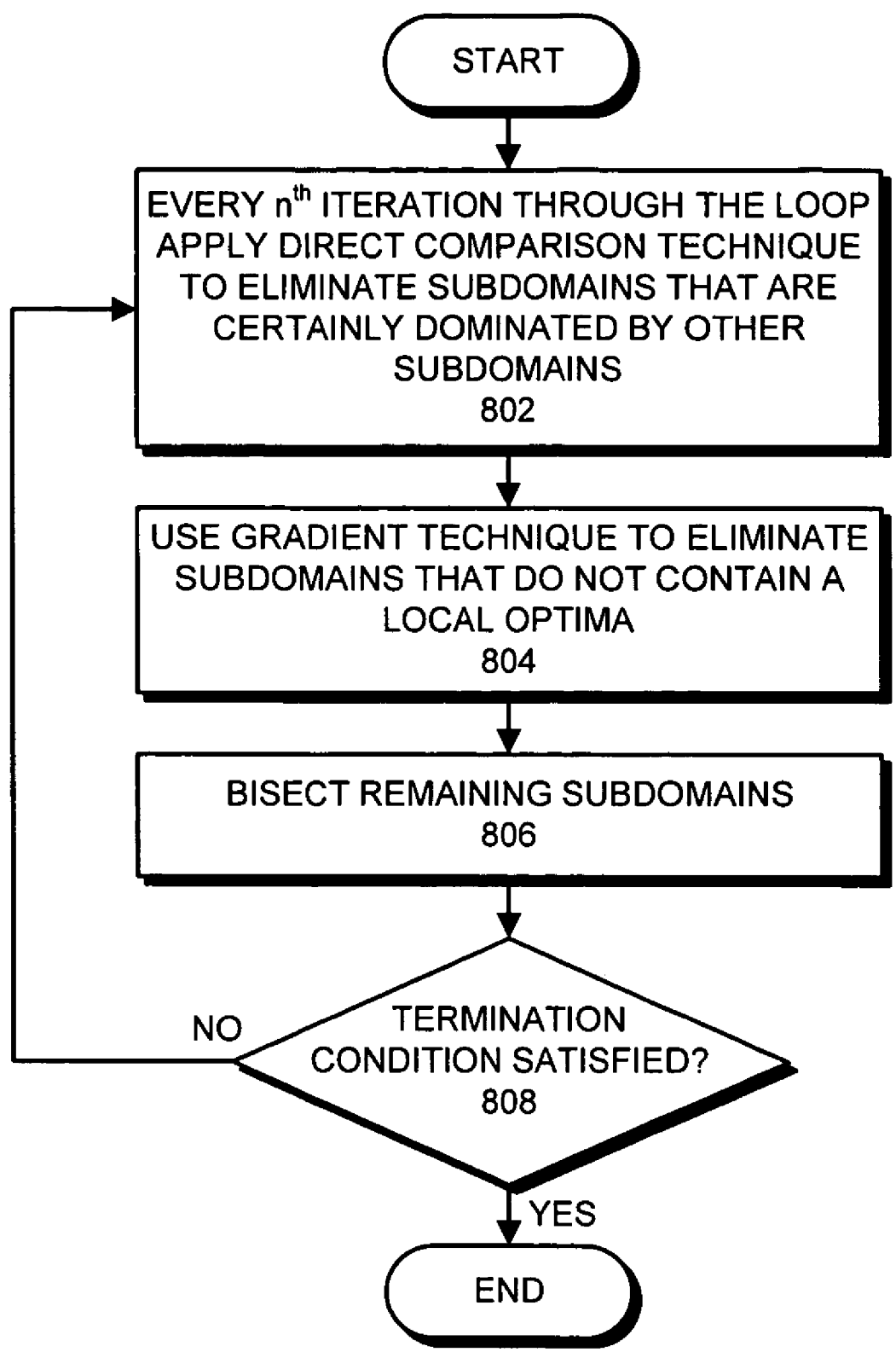
FIG. 8 presents a more-detailed flow chart for the interval optimization process in accordance with an embodiment of the present invention.

The initial condition, or first iteration, of this loop operates on a single "box" which covers the entire domain of interest. Referring to the flowchart in FIG. 8, every few iterations through the loop a consistency check for global Pareto optima is performed using the direct-comparison method from Equation (6) (step 802). This eliminates any boxes which are certainly dominated (step 802). The frequency at which the direct-comparison method occurs is a parameter set by the user.

Next, the loop determines if the boxes can be eliminated on grounds of not containing a local Pareto optimum via the interval-differential formulation in Equation (8) (step 804). The certainly negative gradient regions are represented by interval angles.

To accommodate problems of more than two independent variables, one simply considers the projections of $\underline{N}_j([x]_i)$ and $\overline{N}_j([x]_i)$ on all possible two-dimensional coordinate planes. For the case of two independent variables, one finds certainly negative gradient regions on the $x_1$-$x_2$ plane. In three dimensions this is done on three planes, $(x_1$-$x_2, x_1$-$x_3,$ and $x_2$-$x_3)$, and in D dimensions this operation is performed on D(D-1) such planes. Since the semi-infinite regions $\underline{N}_j([x]_i)$ and $\overline{N}_j([x]_i)$ are bounded by D-dimensional planes, the projection of these regions into each two-dimensional subspace is simply done using the appropriate partial derivatives for the subspace to form the gradient, and then proceeding as if it were a two-dimensional problem.

The intersection of the certainly negative gradient regions within each coordinate plane is performed using these interval angles, accounting for branch cuts when required. While the number of coordinate planes is $O(D^2)$ in number of dimensions, one must remember that the operation performed on each coordinate plane is a simple intersection. The evaluation of the objective gradients, which in general is more time-consuming, is only $O(D)$.

If the intersection of certainly negative gradient regions for all such planes is nonempty, then the box can be removed, meaning they are not advanced into the next iteration. The boxes that do not satisfy this condition are bisected (step 806). The bisection is performed in the direction that has the largest width of partial derivatives of all objective functions over the box. The rationale behind bisecting in this direction is that we want the next iteration of boxes to have the certain negative gradient regions as large as possible, thus increasing the likelihood that $C_i \neq \emptyset$. This is achieved if we bisect a box in the direction where the largest width of the objective functions' partial derivative occurs.

At the end of the loop the system determines if a termination condition is satisfied (step 808). For example, the termination condition can be satisfied if either a specified number of iterations is performed, or the largest area of any interval box $(F_1([x]_i, F_2([x]_i)$ is below some user specified value. If the termination condition is satisfied, the process is complete. Otherwise, the system returns to step 802 to perform another loop iteration.

Second Embodiment

We now describe another embodiment of the present invention that checks for Pareto optimality within a generation of boxes using O(N) comparison operations. However, we first discuss some characteristics of interval mathematics and Pareto optimal sets which make this embodiment possible.

The Fundamental Theorem of Interval Mathematics

One important characteristic of the interval technique relies on the fundamental theorem of interval mathematics. When a function is evaluated over an interval, the resulting interval bounds the function at all points within the interval. This characteristic provides interval computation with its rigor, and in terms of multi-objective optimization provides one with the ability to determine if a box can be deleted from the Pareto front. Since the interval technique starts with a box covering the domain of interest, and only eliminates boxes which are known not to contain a portion of the Pareto front, each generation of boxes is guaranteed to cover the Pareto front. The reason for creating new generations of boxes in the interval technique is not to find the Pareto front, as is the case in genetic algorithms, but rather to tightly represent the Pareto front.

Inclusion Isotonicity

A corollary to the fundamental theorem of interval mathematics is that of inclusion isotonicity. If a function $f$ is evaluated over an interval $X_A = [\underline{x}_A, \overline{x}_A]$, then from the fundamental theorem of interval mathematics we know that the interval evaluation $F(X_A)$ bounds all possible values of $f(x)$ for $x \in X_A$.

If the interval $X_A$ is split into $X_L = [\underline{x}_A, x_m]$ and $X_U = [x_m, \overline{x}_A]$, where $x_m$ is the midpoint of $X_A$, then from the fundamental theorem we know that both $F(X_L)$ and $F(X_U)$ are contained within $F(X_A)$.

Figure 9:
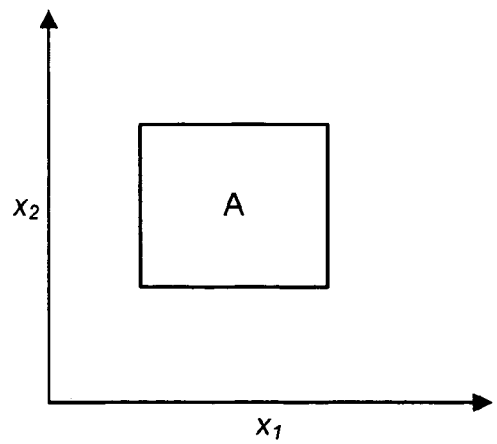
FIG. 9 illustrates the property of inclusion isotonicity in accordance with an embodiment of the present invention.
Figure 9:
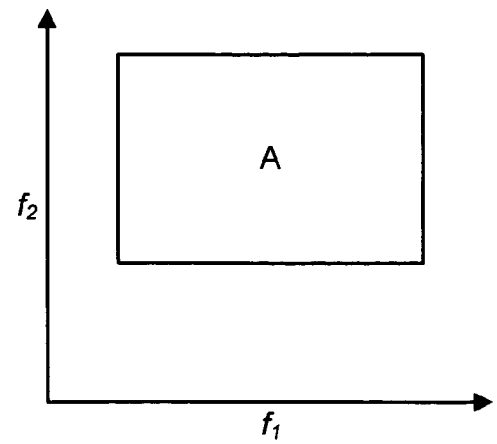
Figure 9:
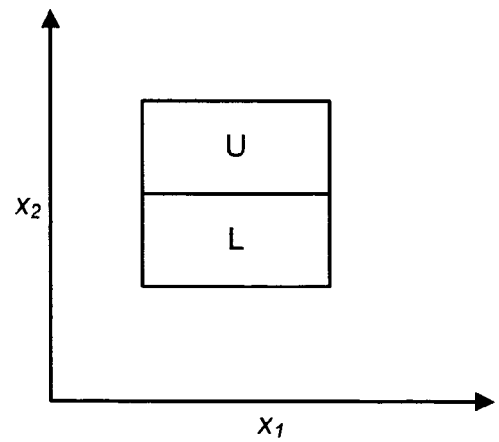
Figure 9:
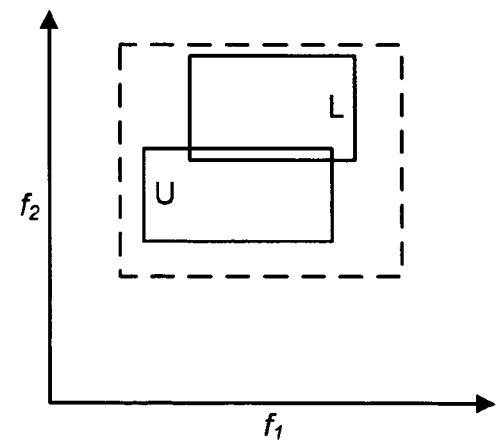

A two-dimensional version of isotonicity is illustrated in FIG. 9. The upper two graphs show a box A in design space (left) and its mapping into objective space (right). The bottom row shows what happens when box A is split in design space (left), and the resulting boxes, U and L, are mapped to objective space. In objective space, U and L must lie inside box A (the dashed box) according to the principle of inclusion isotonicity. (Note that dependency in evaluating the objective functions will cause U and L to be proper subsets of A.

Note that although the subdivided boxes completely cover the original box in design space, their projections in objective space do not cover the projection of the original box in objective space. This is typical, and results whenever there is a dependency in evaluating the objective functions.

Influence and Dominance Regions

A simple way to interpret certain and possible dominance is graphically by considering a box's domain and range of possible and certain dominance. To shorten our notation, we speak of a box's range and domain of influence when referring to its range and domain of possible dominance, and reserve the terms range and domain of dominance to imply certain dominance.

Figure 10:
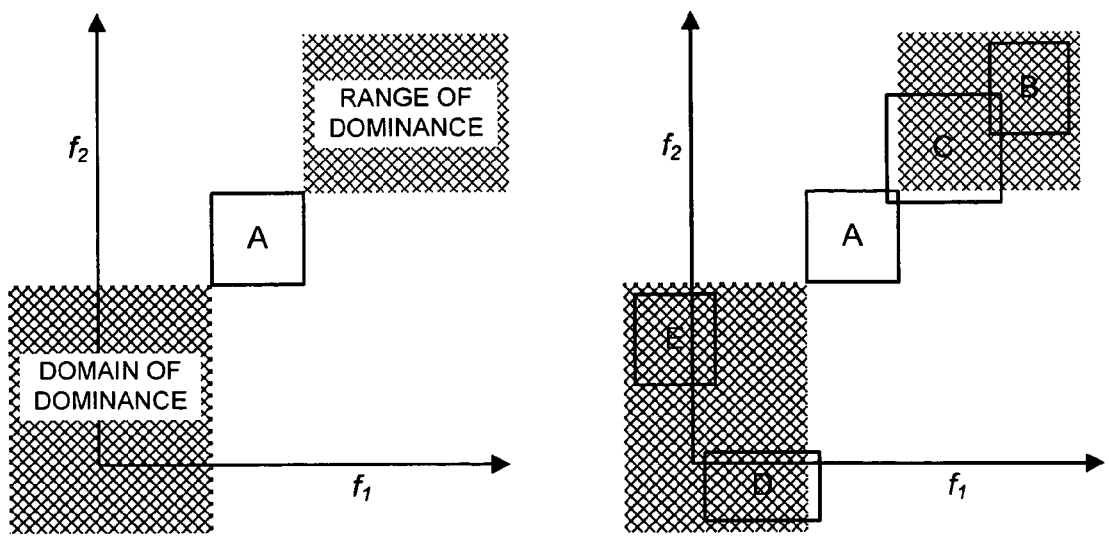
FIG. 10 illustrates dominance regions in objective space in accordance with an embodiment of the present invention.

A box's domain and range of dominance are depicted in FIG. 10. Any box which lies entirely within the range of influence of box A, without intersecting box A, is certainly dominated by box A. This implies that every point in box A dominates every point in the dominated box. Similarly, any box which lies completely within the domain of dominance of box A, without intersecting box A, certainly dominates box A. Several examples are shown on the right, where box B (but not box C) is certainly dominated by box A, and box E (but not box D) certainly dominates box A.

For box A to certainly dominate another box, the other box must be entirely inside box A's range of dominance, without intersecting box A. Likewise, for another box to certainly dominate box A, the other box must lie completely inside box A's domain of dominance, also without intersecting box A.

Figure 11:
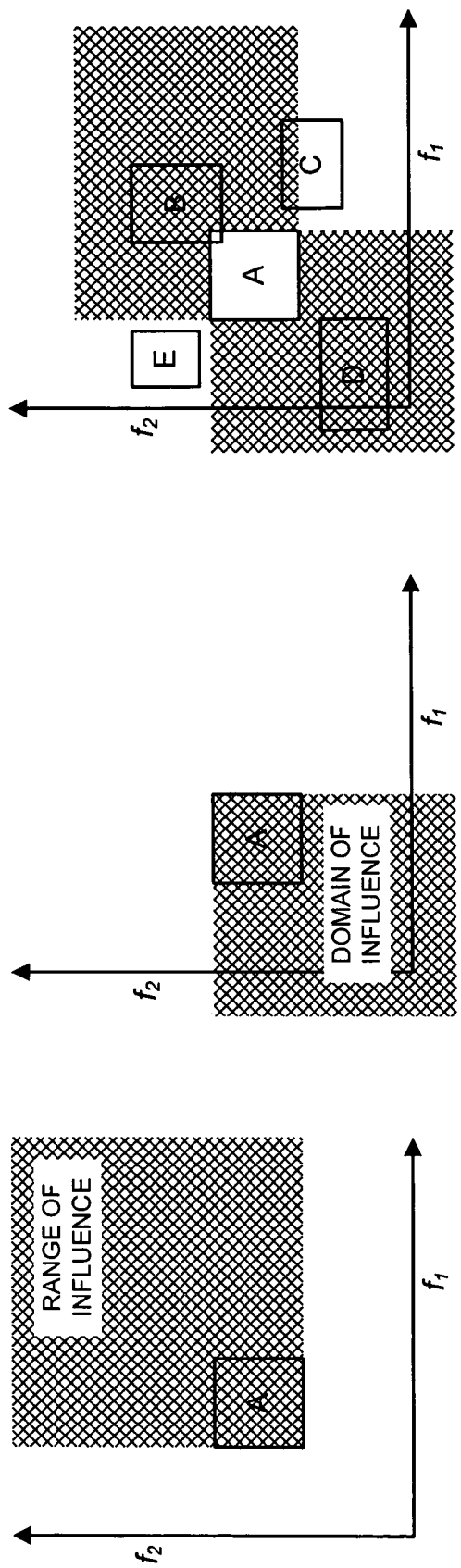
FIG. 11 illustrates influence regions of a box in objective space in accordance with an embodiment of the present invention.

The regions associated with possible dominance in objective space are depicted in FIG. 11. The left two figures show the domain and range of influence for box A. Influence regions convey possibility of dominance in the sense that any box which intersects the domain of influence of box A has at least one point which dominates at least one point in box A. (Any box that intersects box A's range of influence contains at least one point which is dominated by at least one point in box A.) In the interval code, for every box, say box A, three lists of boxes are maintained: boxes which intersect box A and are therefore in both the domain and range of influence of box A, boxes which exclusively intersect box A's domain of influence, and boxes which exclusively intersect box A's domain of influence. (A box that "exclusively intersects" box A's domain-of-influence intersects box A's domain-of-influence but does not intersect box A; or equivalently does not intersect box A's range-of-influence.) For the figure on the right, box B is in box A's intersect list, box C is in box A exclusive range of influence list, and box D is in box A's exclusive domain of influence list. Box E and box A have no influence on each other.

For box A to possibly dominate another box, the other box need only intersect box A's range of influence. Likewise, for another box to possibly dominate box A, the other box need only intersect box A's domain of influence. Unlike the domain and range of dominance, the domain and range of influence overlap. The region of overlap is simply the box itself, and other boxes in this common influence region intersect the aforementioned box.

Direct-Comparison Technique

Having discussed interval dominance, inclusion isotonicity, and regions of influence and dominance, we can now elaborate on the new direct comparison technique. The key to the technique lies in being able to reduce the number of comparisons needed in performing the direct comparison technique. If each box maintains lists of boxes which it may possibly dominate or be possibly dominated by, then only boxes in these lists need to be checked for certain dominance/ elimination by the direct comparison technique.

Figure 12:
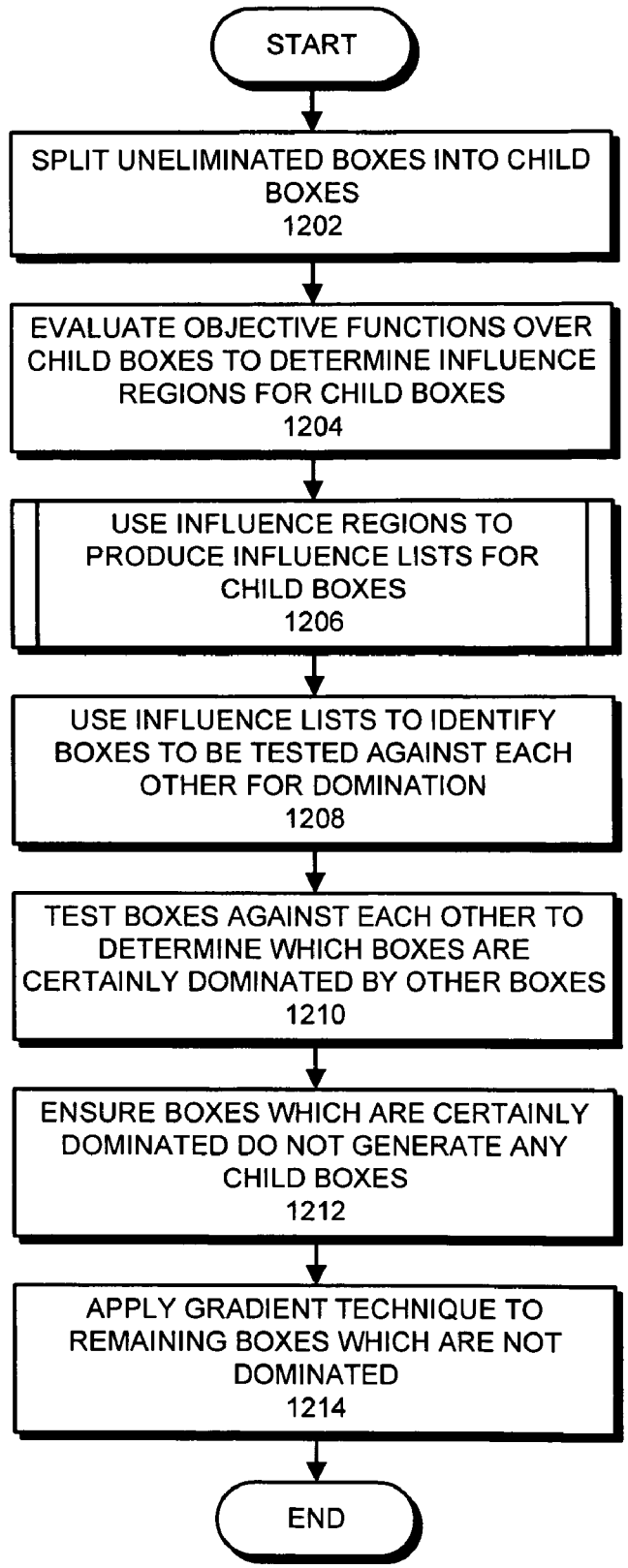
FIG. 12 presents a flow chart of a refined interval optimization process for a multi-objective function, which requires only O(N) comparison operations for each generation of interval boxes, in accordance with an embodiment of the present invention.
Figure 13:
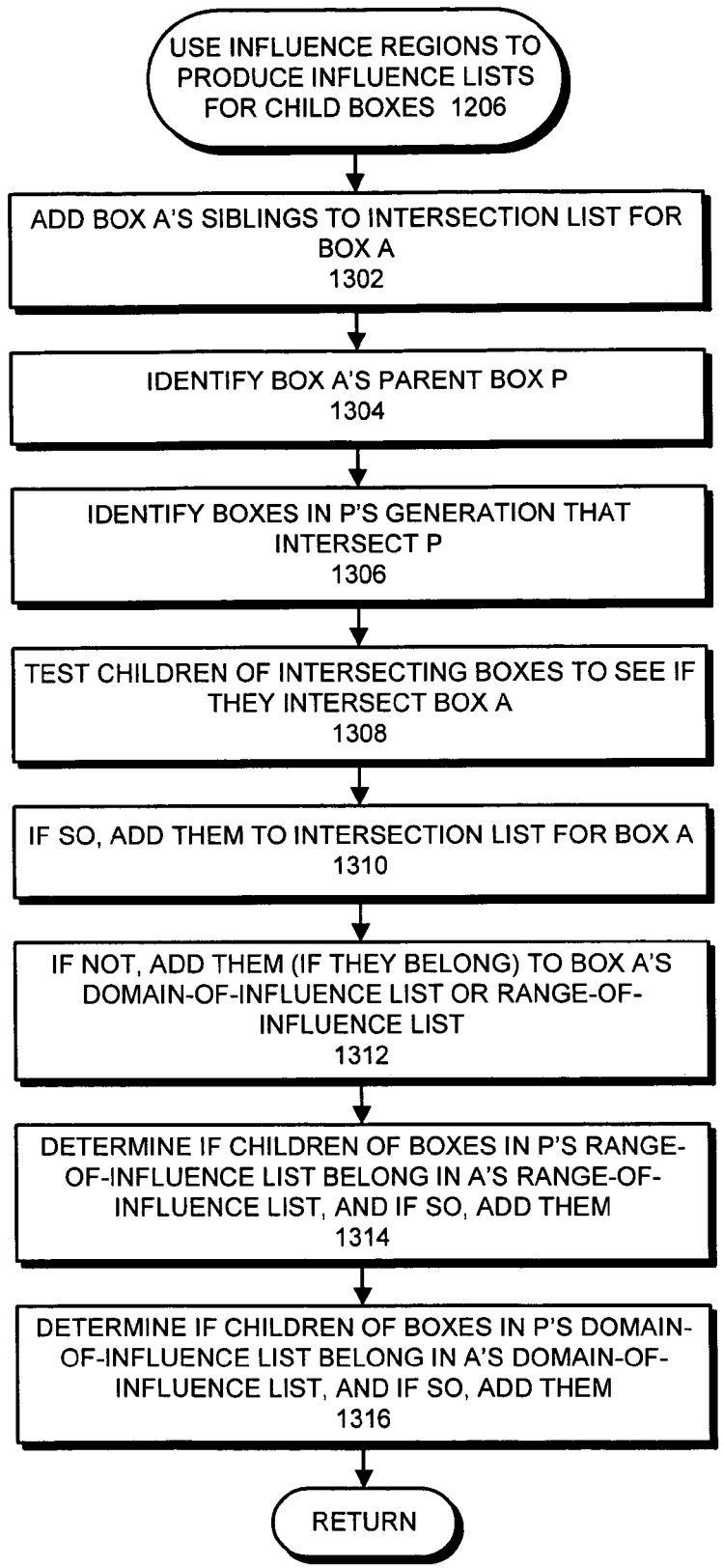
FIG. 13 presents a flow chart illustrating how influence lists for child boxes are created in accordance with an embodiment of the present invention.

It is instructive to view the direct comparison technique in the context of how an entire generation of boxes is processed, since the creation of a new generation has implications on the direct comparison method. The main program contains an outermost loop wherein each iteration corresponds to a generation. Within this loop the following steps are taken (see FIGS. 12 and 13):

1. A new generation is of boxes is created.
   (a) When a new generation of boxes is created, each parent box in design space that has not been eliminated due to either direct comparison or gradient methods is split into child boxes (step 1202 in FIG. 12). The objective functions are evaluated over the child boxes, which provide the influence regions for these boxes (step 1204).
   (b) Influence lists for all boxes in the new generation are determined (step 1206). Associated with each box, say box A, are three lists containing references to other boxes of box A's generation which are in box A's influence regions: boxes that intersect box A, boxes that are exclusively intersect box A's domain of influence, and boxes that exclusively intersect box A's range of influence. We use exclusive here in the sense that the box is not in both influence regions. (See FIG. 11 for examples.)
      i. The first list that is determined for a particular box, say box A, is the intersection list.
         A. The first boxes to be added to this list are box A's siblings (step 1302 in FIG. 13), assuming its siblings share a common point in design space (hence must intersect in objective space).
         B. In determining which non-sibling boxes of the same generation intersect box A, the influence information of box A's parent are leveraged. If box A's parent is box P, then the only boxes in box A's generation that intersect box A, aside from box A's siblings, are the children of boxes in box P's generation that intersect box P. Hence, the system first identifies box A's parent box P (step 1304), and then identifies boxes in P's generation which intersect P (step 1306).
            Looping over these boxes, conditions for intersection with box A are checked (step 1308), and if true reference to the box is added to box A's intersection list (step 1310).
            If a box does not intersect box A, it may still be in box A's exclusive range or domain of influence, and if such conditions are met it is added to box A's respective lists (step 1312).
      ii. We now determine the remaining boxes in box A's exclusive domain and range of influence list. The only remaining boxes in box A's exclusive domain of influence list would be the children of boxes in box P's domain of influence list. Looping over these boxes, intersection with box A's domain of influence is checked and reference to the box is made in box A's domain of influence list if appropriate (step 1314). The same is done for the exclusive range of influence, thus completing box A's influence lists (step 1316).
2. The direct comparison method is applied to the new generation. Each box in the new generation is now checked to see if it is certainly dominated by any other box. Since the domain of dominance is a subset of the exclusive domain of influence, a box need only check for dominance against boxes referenced in its exclusive domain of influence list. This involves first using the influence lists to identify boxes to be tested against each other (step 1208 in FIG. 12) and then testing these boxes against each other (step 1210). (One could equivalently loop over all boxes in the generation, and for each box determine if it dominates other boxes by performing dominance comparisons on boxes in its range of influence list.) If a box is found to be certainly dominated, it is not removed from the generation, but rather does not generate any children when the following generation produced in the next iteration (step 1212). This avoids the costs associated with nullifying references to the box.

3. Once the direct comparison technique is completed, the gradient technique is applied to the remaining boxes which are not dominated (step 1214). As with the direct comparison technique, when a box is determined to be dominated, it is not deleted from the generation, but rather simply does not produce offspring in the next generation.

Each of the steps above are O(N) where N is the number of boxes within a generation. The average population of influence lists change throughout the course of the simulation. During the initial generations, where N is small, the influence lists are typically heavily populated. During latter generations, where the Pareto front is refined, there are typically $O(2^n)$ boxes in the influence lists, where n is the number of objectives.

The above iteration over generations assumes the influence lists of the previous generation are known. This process is self starting, since typically the interval code is initialized with only one box. Even is one were to start with multiple boxes, a simple $O(N^2)$ loop can be used to populate the influence lists. This is not a problem as long as N is reasonably small.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-controlled method for using interval techniques within a computer system to solve a multi-objective optimization problem and identify a solution set that represents an optimal trade-off solution, comprising:
   receiving a representation of multiple objective functions at the computer system;
   receiving a representation of a domain of interest for the multiple objective functions, wherein the domain of interest is an interval within which function variables for the objective functions lie;
   storing the representations in a memory within the computer system;
   performing a composite interval optimization process in order to identify guaranteed bounds on a Pareto front for the received multiple objective functions, wherein the composite process comprises a direct comparison technique and an interval version of a differential formulation,
      wherein performing the portion of the interval optimization process comprising the direct comparison technique involves:
         determining a first box covering the entire received domain of interest, and subdividing the first box into other boxes;
         maintaining influence information for the other boxes in the received domain of interest, wherein for a given box the influence information identifies other boxes which are in the range of influence of the given box and/or in the domain of influence of the given box, wherein the range and domain of influence of the given box describe the range and domain of possible dominance,
         using the influence information to identify boxes to be tested against each other for domination,
         testing boxes against each other to determine which boxes are certainly dominated by other boxes, and
         eliminating boxes which are certainly dominated by other boxes; and
      wherein performing the portion of the interval optimization process comprising the interval version of the differential formulation involves:
         applying a gradient technique to the remaining boxes to eliminate boxes that do not have a local Pareto optimum; and
         identifying the remaining boxes as representing guaranteed bounds on a Pareto front for the received representation of the multiple objective functions, wherein the guaranteed bounds are machine-representable upper and lower bounds on the Pareto front for the received representation of the multiple objective functions;
   identifying a solution set of optimal points on the Pareto front using the guaranteed bounds of the Pareto front, wherein for each point within the guaranteed bounds on the Pareto front, an improvement in one objective function cannot be made without adversely affecting at least one other objective function; and
   identifying values of the objective functions' independent variables that are mapped to the set of optimal points on the Pareto front.

2. The method of claim 1, wherein the influence information for a box A contains influence lists, including:
   an intersection list identifying boxes that intersect box A;
   a domain-of-influence list identifying boxes that exclusively intersect box A's domain of influence; and
   a range-of-influence list identifying boxes that exclusively intersect the box A's range of influence.

3. The method of claim 2, wherein a box B is tested to see if it is certainly dominated by a box A if:
   box A exclusively intersects box B's domain of influence; or
   box B exclusively intersects box A's range of influence.

4. The method of claim 2, wherein the interval optimization process also involves iteratively:
   splitting remaining boxes that have not been eliminated into child boxes;
   evaluating the multiple object functions over the child boxes to determine influence regions for the child boxes; and
   using the influence regions for the child boxes to produce influence lists for the child boxes.

5. The method of claim 4, wherein producing influence lists for a child box A involves:
   adding box A's siblings to the intersection list for box A;
   identifying box A's parent box P;
   identifying "intersecting boxes" in P's generation which intersect box P;
   testing children of these intersecting boxes to see if they intersect box A;
   if so, adding the intersecting children to the intersection list for box A;
   if not, adding the non-intersecting children, if they belong, to box A's domain-of-influence list or range-of-influence list;
   determining if children of boxes in parent box P's range-of-influence list belong in box A's range-of-influence list, and if so adding them to box A's range-of-influence list; and
   determining if children of boxes in parent box P's domain-of-influence list belong in box A's domain-of-influence list, and if so adding them to box A's domain-of-influence list.

6. The method of claim 4, wherein the iterations continue until either a predetermined maximum number of iterations are performed, or until the largest area of any box is below a predetermined value.

7. The method of claim 1, wherein a box $[x]_j$ is eliminated by the gradient technique if an intersection of regions $C_j$ for each objective function $f_j$ is non-empty, $$\bigcap_{j=1}^{n} C_j([x]_j) \neq \varnothing;$$

wherein the region $C_j$ for objective function $f_j$ is the intersection of $\underline{N}_j([x]_i)$, wherein $\underline{N}_j([x]_j)$ is the negative gradient region associated with the minimum angle $\underline{\theta}_j$ of the gradient of $f_i$ over the box $[x]_i$, and $\overline{N}_j([x]_i)$ wherein N) is the negative gradient region associated with the maximum angle $\overline{\theta}_j$ of the gradient of $f_i$ over the box $[x]_i$, wherein:
  the direction of the gradient of the j-th objective function, $f_i$, is denoted as the angle, $\theta_j$, the interval of the domain is denoted as the box, $[x]_j$, the gradient of the j-th objective function over the i-th box takes a range of directions $[\underline{\theta}_j, \overline{\theta}_j]$, and $\underline{N}_j([x]_i)$, and $\overline{N}_j([x]_i)$ represent the range of negative gradient regions associated with this range of directions.

8. The method of claim 1,
wherein a box U certainly dominates a box V if every point u∈U dominates every point v∈V; and
wherein a point u dominates a point v under minimization if, $u_i \leq v_i$, i=1, ..., n, and $u_i < v_i$ for some i∈{1, ..., n}.

9. A computer-readable storage medium storing instructions that when executed by a computer cause the computer to perform a computer-controlled method for using interval techniques within a computer system to solve a multi-objective optimization problem and identify a solution set that represents an optimal trade-off solution, the method comprising:
  receiving a representation of multiple objective functions at the computer system;
  receiving a representation of a domain of interest for the multiple objective functions, wherein the domain of interest is an interval within which function variables for the objective functions lie;
  storing the representations in a memory within the computer system; and
  performing a composite interval optimization process in order to identify guaranteed bounds on a Pareto front for the multiple objective functions, wherein the composite process comprises a direct comparison technique and an interval version of a differential formulation,
    wherein performing the portion of the interval optimization process comprising the direct comparison technique involves:
      determining a first box covering the entire received domain of interest, and subdividing the first box into other boxes;
      maintaining influence information for the other boxes in the received domain of interest, wherein for a given box the influence information identifies other boxes which are in the range of influence of the given box and/or in the domain of influence of the given box, wherein the range and domain of influence of the given box describe the range and domain of possible dominance,
      using the influence information to identify boxes to be tested against each other for domination,
      testing boxes against each other to determine which boxes are certainly dominated by other boxes, and
      eliminating boxes which are certainly dominated by other boxes; and
    wherein performing the portion of the interval optimization process comprising the interval version of the differential formulation involves:
      applying a gradient technique to the remaining boxes to eliminate boxes that do not have a local Pareto optimum; and
      identifying the remaining boxes as representing guaranteed bounds on a Pareto front for the received representation of the multiple objective functions, wherein the guaranteed bounds are machine-representable upper and lower bounds on the Pareto front for the received representation of the multiple objective functions;
  identifying a solution set of optimal points on the Pareto front using the guaranteed bounds of the Pareto front, wherein for each point within the guaranteed bounds on the Pareto front, an improvement in one objective function cannot be made without adversely affecting at least one other objective function; and
  identifying values of the objective functions' independent variables that are mapped to the set of optimal points on the Pareto front.

10. The computer-readable storage medium of claim 9, wherein the influence information for a box A contains influence lists, including:
  an intersection list identifying boxes that intersect box A;
  a domain-of-influence list identifying boxes that exclusively intersect box A's domain of influence; and
  a range-of-influence list identifying boxes that exclusively intersect the box A's range of influence.

11. The computer-readable storage medium of claim 10, wherein a box B is tested to see if it is certainly dominated by a box A if:
  box A exclusively intersects box B's domain of influence; or
  box B exclusively intersects box A's range of influence.

12. The computer-readable storage medium of claim 10, wherein the interval optimization process also involves iteratively:
  splitting remaining boxes that have not been eliminated into child boxes;
  evaluating the multiple object functions over the child boxes to determine influence regions for the child boxes; and
  using the influence regions for the child boxes to produce influence lists for the child boxes.

13. The computer-readable storage medium of claim 12, wherein producing influence lists for a child box A involves:
  adding box A's siblings to the intersection list for box A;
  identifying box A's parent box P;
  identifying "intersecting boxes" in P's generation which intersect box P;
  testing children of these intersecting boxes to see if they intersect box A;
  if so, adding the intersecting children to the intersection list for box A;

if not, adding the non-intersecting children, if they belong, to box A's domain-of-influence list or range-of-influence list;

determining if children of boxes in parent box P's range-of-influence list belong in box A's range-of-influence list, and if so adding them to box A's range-of-influence list; and determining if children of boxes in parent box P's domain-of-influence list belong in box A's domain-of-influence list, and if so adding them to box A's domain-of-influence list.

14. The computer-readable storage medium of claim 12, wherein the iterations continue until either a predetermined maximum number of iterations are performed, or until the largest area of any box is below a predetermined value.

15. The computer-readable storage medium of claim 9, wherein a box $[x]_i$ is eliminated by the gradient technique if an intersection of regions $C_j$ for each objective function $f_i$ is non-empty, $$\bigcap_{j=1}^{n} C_j([x]_j) \neq \emptyset;$$

wherein the region $C_j$ for objective function $f_i$ is the intersection of $\underline{N_j}([x]_i)$, wherein $\underline{N_j}([x]_i)$ is the negative gradient region associated with the minimum angle $\underline{\theta_j}$ of the gradient of $f_j$ over the box $[x]_i$, and $\overline{N_j}([x]_i)$, wherein $\overline{N_j}([x]_i)$ is the negative gradient region associated with the maximum angle $\overline{\theta_j}$ of the gradient of $f_j$ over the box $[x]_i$, wherein:

the direction of the gradient of the j-th objective function, $f_j$, is denoted as the angle, $\theta_j$, the interval of the domain is denoted as the box, $[x]_j$, and the gradient of the j-th objective function over the i-th box takes a range of directions $[\underline{\theta_j}, \overline{\theta_j}]$, and $\underline{N_j}([x]_i)$, and $\overline{N_j}([x]_i)$ represent the range of negative gradient regions associated with this range of directions.

16. The computer-readable storage medium of claim 9, wherein a box U certainly dominates a box V if every point u∈U dominates every point v∈V; and wherein a point u dominates a point v under minimization if, $u_i \leq v_i$, i=1, ..., n, and $u_i < v_i$ for some I∈{1, ..., n}.

17. An apparatus for using interval techniques within a computer system to solve a multi-objective optimization problem and identify a solution set that represents an optimal trade-off solution, comprising:

a receiving mechanism configured to receive a representation of multiple objective functions at the computer system;

wherein the receiving mechanism is additionally configured to receive a representation of a domain of interest for the multiple objective functions, wherein the domain of interest is an interval within which function variables for the objective functions lie;

a storage mechanism configured to store the representations in a memory within the computer system; and an optimization mechanism configured to perform a composite-interval optimization process in order to identify guaranteed bounds on a Pareto front for the multiple objective functions, wherein the composite process comprises a direct comparison technique and an interval version of a differential formulation, wherein while performing the portion of the interval optimization process comprising the direct comparison technique, the optimization mechanism is configured to, determine a first box covering the entire received domain of interest, and subdivide the first box into other boxes;

maintain influence information for the other boxes in the received domain of interest, wherein for a given box the influence information identifies other boxes which are in the range of influence of the given box and/or in the domain of influence of the given box, wherein the range and domain of influence of the given box describe the range and domain of possible dominance, use the influence information to identify boxes to be tested against each other for domination, test boxes against each other to determine which boxes are certainly dominated by other boxes, and eliminate boxes which are certainly dominated by other boxes; and wherein, while performing the portion of the interval optimization process comprising the interval version of the differential formulation, the optimization mechanism is further configured to:

apply a gradient technique to the remaining boxes to eliminate boxes that do not have a local Pareto optimum; and identify the remaining boxes as representing guaranteed bounds on a Pareto front for the received representation of the multiple objective functions, wherein the guaranteed bounds are machine-representable upper and lower bounds on the Pareto front for the received representation of the multiple objective functions;

identify a solution set of optimal points on the Pareto front using the guaranteed bounds of the Pareto front, wherein for each point within the guaranteed bounds on the Pareto front, an improvement in one objective function cannot be made without adversely affecting at least one other objective function; and to identify values of the objective functions' independent variables that are mapped to the set of optimal points on the Pareto front.

* * * * *

UNITED STATES PATENT AND TRADEMARK OFFICE
CERTIFICATE OF CORRECTION

PATENT NO. : 7,742,902 B1
APPLICATION NO. : 11/029609
DATED : June 22, 2010
INVENTOR(S) : Gregory R. Ruetsch It is certified that error appears in the above-identified patent and that said Letters Patent is hereby corrected as shown below:

In column 2, line 35, delete "to" and insert -- too --, therefor.

In column 5, line 48, delete "$f2(x_1, x_2)$" and insert -- $f2(x, x_2)$ --, therefor.

In column 5, line 63-64, delete "[-1/2,/1;2])" and insert -- [-1/2, 1/2]) --, therefor.

In column 6, line 21, delete "$f_i$" and insert -- $f_1$ --, therefor.

In column 7, line 43, delete "Ni∩" and insert -- $N_i \cap \Omega$ --, therefor.

In column 7, line 53-58, delete "Here the gradients are co-linear but opposite in direction, and as such the intersection $N_1 \cap N_2$ is empty. Therefore, this point is locally Pareto optimal. Note that the only way an interior point in a two-objective optimization problem can be Pareto optimal is when the gradients are co-linear but opposite." and insert the same on Col. 7, Line 52, as a continuation of paragraph.

In column 8, line 67, delete "I" and insert -- i --, therefor.

In column 10, line 15, delete "$f_i$," and insert -- $f_j$, --, therefor.

In column 15, line 19, delete "is" and insert -- if --, therefor.

In column 17, line 15, in claim 7, delete " $\underline{N_j([x]_j)}$ " and insert -- $\underline{N_j([x]_j)}$ --, therefor.

In column 17, line 17, in claim 7, delete "$f_i$" and insert -- $f_j$ --, therefor.

In column 17, line 17, in claim 7, before "wherein" insert -- , --.

Signed and Sealed this
Twenty-sixth Day of July, 2011

David J. Kappos
*Director of the United States Patent and Trademark Office*

CERTIFICATE OF CORRECTION (continued)
U.S. Pat. No. 7,742,902 B1

In column 17, line 17, in claim 7, delete "N)" and insert -- $\overline{N_j}([x]_i)$ --, therefor.

In column 17, line 19, in claim 7, delete "f$_i$" and insert -- f$_j$ --, therefor.

In column 17, line 22, in claim 7, delete "f$_i$," and insert -- f$_j$, --, therefor.

In column 17, line 23, in claim 7, delete "[x]$_j$," and insert -- [x]$_i$, --, therefor.

In column 17, line 25, in claim 7, delete " $[\theta_j, \overline{\theta_j}]$, and $N_j([x]_i)$, and $\overline{N_j}([x]_i)$ " and insert -- $[\underline{\theta_j}, \overline{\theta_j}]$, and $\underline{N}_j([x]_i)$, and $\overline{N}_j([x]_i)$ --, therefor.

In column 19, line 18, in claim 15, delete "f$_i$" and insert -- f$_j$ --, therefor.

In column 19, line 27, in claim 15, delete "f$_i$" and insert -- f$_j$ --, therefor.

In column 19, line 37, in claim 15, delete "[x]$_j$," and insert -- [x]$_i$, --, therefor.

In column 19, line 50, in claim 16, delete "for some I" and insert -- for some i --, therefor.